July 14, 1931.    J. V. W. PHILLIPS    1,814,455
SHADE OPERATING DEVICE FOR MOTOR CARS
Filed Jan. 30, 1928
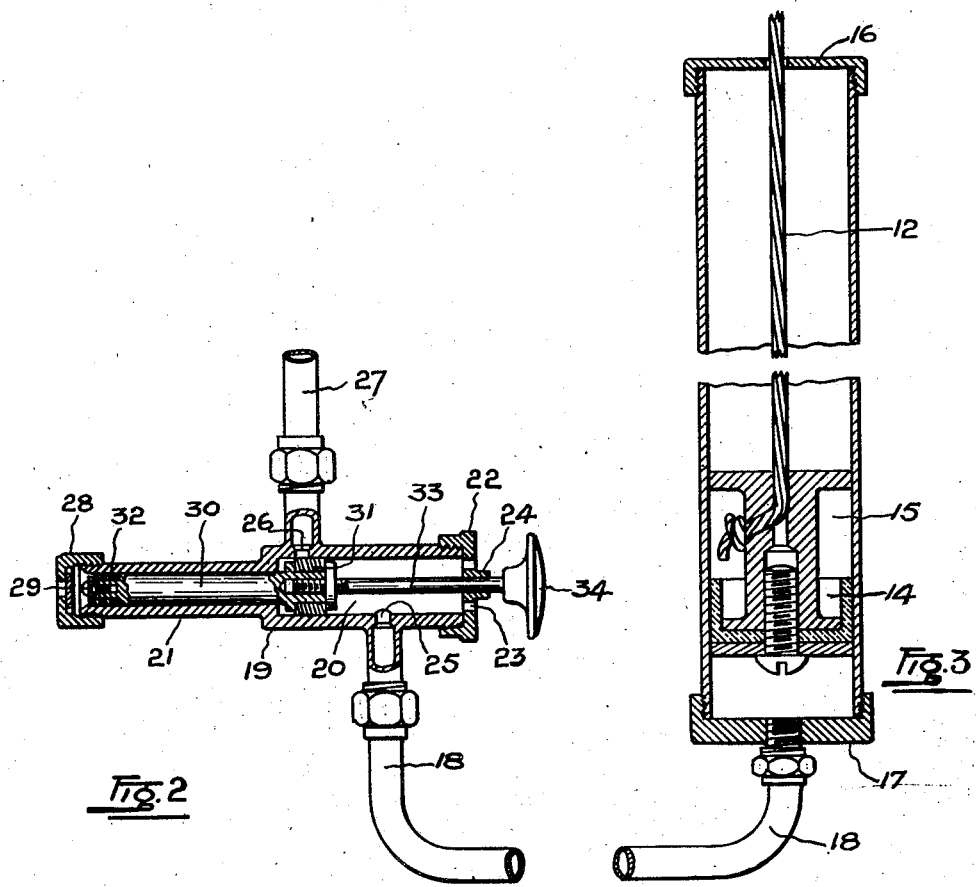
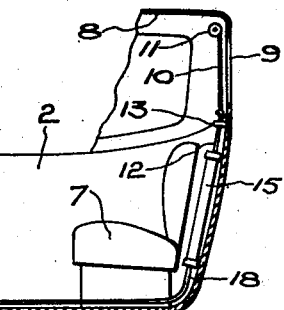
INVENTOR
JAMES VICTOR WILSON PHILLIPS
BY
*Fetherstonhaugh & Co*
ATTORNEYS Patented July 14, 1931

1,814,455

UNITED STATES PATENT OFFICE

JAMES VICTOR WILSON PHILLIPS, OF NEW WESTMINSTER, BRITISH COLUMBIA, CANADA

SHADE OPERATING DEVICE FOR MOTOR CARS

Application filed January 30, 1928. Serial No. 250,678.

My invention relates to improvements in shade operating devices for motor cars, which are particularly adapted for use on closed cars wherein, during night driving the illumination of the rear window and windshield of the car from the headlights of a following car, reflects back into the driver's face from the windshield. The object of the invention is to provide means operated from the engine of the car whereby the shade fitted to the rear window may be lowered or raised at will by a simple movement of the driver. A further object is to provide means whereby the operation of a single knob will draw down the shade and cause it to remain in drawn position, to draw it down and immediately permit it to be raised, and to permit it to be raised from drawn position when desired.

The invention consists essentially of a vacuum operated piston in a single acting cylinder in communication with the engine manifold, which piston is operatively connected to a pair of side cords attached to a shade fitted to a self winding roller of the Hartshorn or other similar type, as will be more fully described in the following specification and shown in the accompanying drawings, in which:—

Fig. 1 is a sectional view of car body showing the application of the invention to the rear window shade.

Fig. 2 is a sectional view of the control valve.

Fig. 3 is a sectional view of the operating cylinder.

In the drawings like characters of reference indicate corresponding parts in each figure.

The numeral 1 indicates generally a motor car having a body 2, an engine 3, fitted with a carburetor 4 and an intake manifold 5. The numeral 6 indicates the instrument board, 7 the rear seat, 8 the top and 9 the rear window which is fitted with a shade 10 mounted upon a Hartshorn or other suitable roller, which is adapted to be released for rewinding the shade immediately following a sharp downward pull being imparted to the shade and to be held in lowered position if released slowly. The shade is fitted with a cord 12 which is led through a suitable eyelet as at 13 and secured to a piston 14, see Figure 3, within a vacuum cylinder 15, which cylinder is preferably mounted in vertical position behind the upholstery of the rear seat 7 as shown in Figure 1. The cylinder 15 is fitted with an apertured upper closure 16 through which the cord 12 extends and is provided with a bottom closure 17 from which a communicating tube 18 extends along or below the floor of the car body thence extending upwards to a control valve generally indicated by the numeral 19. The control valve 19, see Figure 2, consists of a horizontal body in which a pair of aligned cylinders respectively numbered 20 and 21 are formed, the former being of larger internal diameter than the latter.

The outer end of the cylinder 20 is fitted with a head 22 which is apertured as at 23 and is provided with a central boss 24 forming a guide for a piston rod to be hereinafter referred to. A port 25 is provided in the wall of the cylinder 20 intermediate its length, which communicates through the tube 18 with the vacuum cylinder 15. A further port 26 is provided adjacent the inner end of the cylinder 20 which communicates through a tube 27 with the intake manifold 5 of the engine 3. The outer end of the cylinder 21 is fitted with an apertured cap 28 fitted on its inner side with a felt washer 29 or other device for permitting a suitable leakage therethrough. The body 19 is fitted with an elongated member 30 having suitable pistons 31 and 32. The piston 31 fitting the cylinder 20 and the piston 32 fitting the cylinder 21. Extending from the member 30 is a rod 33 fitted with a knob 34 by which the pistons may be manually moved in either direction.

Having thus described the several parts of my invention I will now briefly explain its function.

Assuming the shade 10 to be rolled up and it being desired to lower it, it suffices to withdraw the knob 34 to the limit of its stroke, which will dispose the pistons 31 and 32 at the opposite ends of the cylinders 20 and 21 to that shown, thus uncovering both the ports 25 and 26, so that the suction produced by the engine in the manifold 5 influences the piston 14 in the vacuum cylinder 15 to draw it downwards and through the cord 12 lower the shade 10. As the knob 34 is released the suction within the body 19 having a greater pull on the piston 31 than on the piston 32 will cause the member 30 to move to the left, this movement will be relatively slow owing to a slight compression between the piston 32 and the leak washer 29 in the cap 28 on the outer end of the cylinder 21. The return movement will first cause the piston 31 to cover the port 25, thus bringing the piston 14 and the shade 10 to rest, subsequent movement will slowly uncover the port 25 and admit atmospheric air received through the apertures 23 in the head 22 into the tube 18 and the vacuum cylinder 15, thus allowing a slight upward movement of the piston 14 therein, until the pawls or other locking devices of the shade roller 9 engage to prevent the further rotation of the roller, thus leaving the shade in drawn position. The further suction from the manifold will continue to draw the member 30 endwise to the left until the piston 31 has covered the port 26 and the influence of the suction has been overcome, thus restoring the knob to normal position as shown. If the knob is withdrawn and returned quickly to normal position with the shade in drawn position, a suction will first be applied through the ports 25 and 26 to the cylinder 15, drawing down the piston 14 momentarily to release the pawls of the shade roller 11, which is immediately followed by air being freely admitted to the tube 18 as the port 25 is uncovered to communicate with the apertures 23 of the head 22, thus releasing all tension on the cord 12 and allowing the spring of the roller 11 to function and rewind the shade 10.

When desired to draw down the shade and raise it after a very short interval, the knob 34 is withdrawn and held in extended position during such interval, and then by quickly returning it to normal position, the suction in the cylinder 15 is immediately changed to an atmospheric condition, thus allowing the piston 14 to rise under the pull of the spring of the roller 11 as previously described.

What I claim as my invention is:

1. A spring roller shade operating means, comprising a vacuum cylinder, a piston therein, a flexible element connecting the shade and piston, a second cylinder communicating with the vacuum cylinder, a suction pipe communicating with the second mentioned cylinder, whereby suction is created within the vacuum cylinder to operate the piston in one direction and lower the shade, a piston in the second mentioned cylinder and manually operated in one direction to establish communication between the suction pipe and vacuum cylinder, and automatically returned by suction to its normal position to cut off said communication.

2. A spring roller shade operating means, comprising a vacuum cylinder, a piston therein, a flexible element connecting the shade and piston, a second cylinder communicating with the vacuum cylinder, a suction pipe communicating with the second mentioned cylinder, a piston in the second mentioned cylinder, a rod connected with the piston to manually operate the latter in one direction and establish communication between the suction pipe and vacuum cylinder, whereby the piston in the latter is moved in one direction to lower the shade, the piston of the second mentioned cylinder being automatically returned by suction to its normal position to cut off said communication, and means for retarding the movement of the last mentioned piston to its normal position.

3. A suction operated mechanism of the character described comprising a vacuum cylinder, a piston therein, a second cylinder including portions of relatively different diameters arranged in end to end relation, a suction pipe communicating with the larger portion, means establishing communication between said portion and the vacuum cylinder, a piston operating in said portion, means for manually operating the piston in one direction to establish communication between the suction pipe and vacuum cylinder, said piston being automatically returned by suction to its normal position to cut off said communication, and a plunger carried by said piston and operating in the small portion of the cylinder to retard the return movement of said piston.

Dated at Vancouver, B. C., this 20th day of January, 1928.

JAMES VICTOR WILSON PHILLIPS.